May 21, 1968     W. SCHENKEL     3,383,976
SCREW ANCHOR WITH INCLINED FINS
Filed Jan. 10, 1966
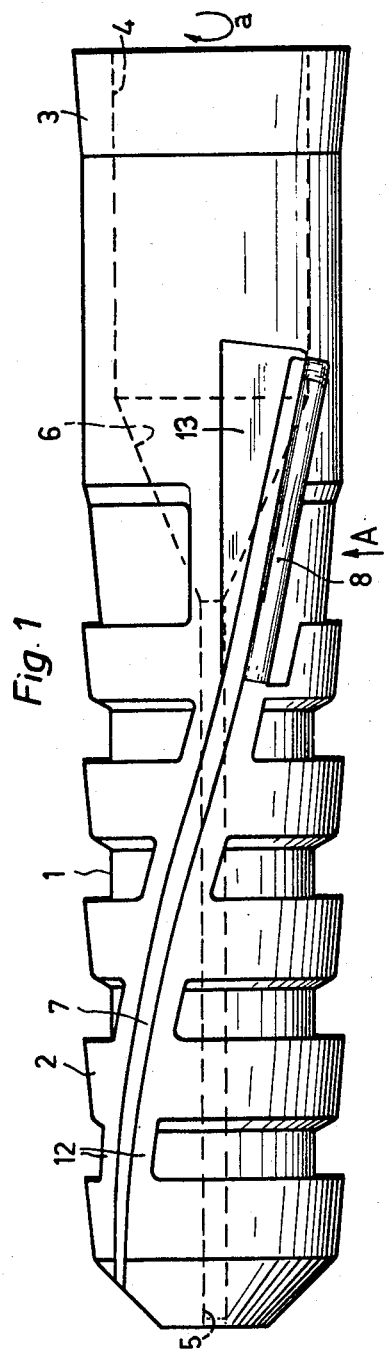
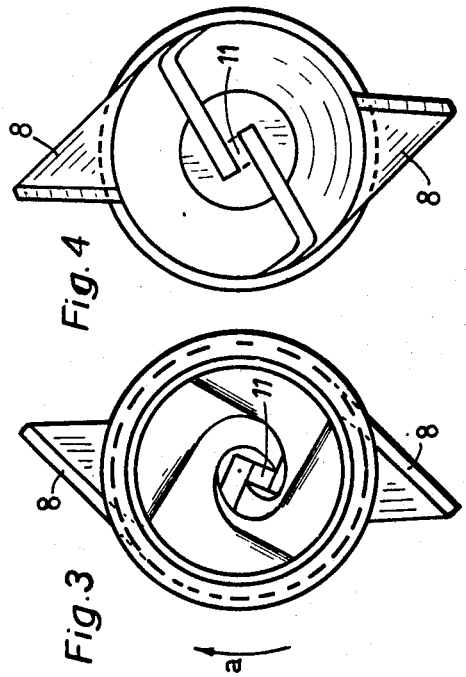
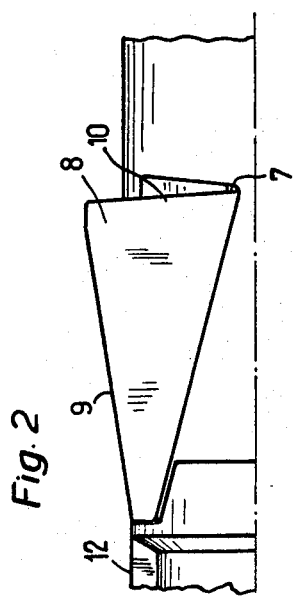
INVENTOR
WILLI SCHENKEL

United States Patent Office 3,383,976
Patented May 21, 1968

3,383,976
SCREW ANCHOR WITH INCLINED FINS
Willi Schenkel, Zurich, Switzerland, assignor to
Glarex A.G., Glarus, Switzerland
Filed Jan. 10, 1966, Ser. No. 519,769
Claims priority, application Switzerland, Feb. 3, 1965,
1,467/65
5 Claims. (Cl. 85—80)

ABSTRACT OF THE DISCLOSURE

An anchoring member for screws in which the member is slit at one end and provided adjacent the slits with wings which prevent the member from turning in the hole receiving it. Each wing is of triangular shape, joined at its base with a member and having an edge defined by another leg which is contained within a plane passing through the axis of the member. In this way the member is not forced to rotate as it is inserted and good resistance to rotation of the member is obtained during subsequent insertion of a screw.

---

The present invention relates to an anchor of synthetic plastic having over at least a portion of its length projecting, resilient wings, serving to prevent rotation of the anchor in a hole.

In the prior art, it has been proposed, to prevent such rotation, that the anchor be provided with at least two circumferentially spaced wings that project obliquely and rearwardly. The wings, however, are secured to the anchor body only at their front ends and, extending rearwards unsupported, do not satisfactorily secure the anchor against rotation.

The present invention has for its object an anchor that is satisfactorily prevented from rotating in a hole when the tightening screw is turned in.

The invention will be described in detail, with reference to the accompanying figures, wherein:

FIGURE 1 is a side view of the anchor;

FIGURE 2 is a partial view of the anchor seen in the direction of arrow A, FIGURE 1; and FIGURES 3 and 4 are views of the anchor seen from below and above.

FIGURE 1 shows a synthetic plastic expansion anchor—which, for example, can be made of nylon—having an expansion head 1 with circumferential ribs 2. Connected to the head 1 is a throat portion 3 provided with a cylindrical opening 4 that may or may not be threaded and that accepts the tightening screw, not shown.

The much smaller central passage 5 is connected to the opening 4 by a threaded conical orifice 6. The head 1 possesses two helical openings or slits 7 (of which only one is shown), extending along the entire length of the expansion head 1 and opening into the passage 5. The openings 7 are spaced 180° apart and extend part ways into the throat 3, FIGURE 1. These two openings spiral in the same direction as do the threads of the tightening screw. Since the helices spiral towards the right, the tightening screw must have right hand threads. A flat, triangular flexible wing 8, beginning at the lower end of a respective opening 7 and extending part ways along the rear edge thereof, projects obliquely from the anchor body to form an acute angle therewith. Thus, each wing slants in the screw-in direction *a* of the tightening screw, FIGURES 2 and 3.

As shown in FIGURE 2, a wing 8 converges in the direction of the front end of the anchor, so that the leading edge 9 of the wing merges into a rib 12. The inclination of the edge 9 is so chosen that the edge is essentially parallel to the axis of the anchor when the wing is pressed down. The leading edge at the lower portion 9a is truncated so that it extends parallel to the anchor axis when the wings are in their normally projecting position.

The lower edge 10 of a wing 8 preferably approaches the anchor body tangentially, so that as one proceeds upwards along the wing, the wing comes to project more and more nearly radially from the body of the anchor.

As best illustrated in FIGURE 1, a triangular depression 13 is located opposite each wing in the area neighboring the slit 7. The depressions receive the wings when the latter are bent against the anchor body.

The wings preferably extend at the most over not more than one-quarter of the length of the anchor, and thus continue to about the middle of the anchor. The line defined at where a wing joins the anchor body can slant 10-20° with respect to the axis of the anchor.

In accordance with the invention, a portion or more of the wings can project into the interior of the anchor, for reasons to be explained.

The slots 7 and/or wings 8 advantageously extend partly into the interior of the anchor body in the region of the cylindrical opening 4.

In order to prevent premature spreading apart of the anchor head, such as might be caused by warping of the plastic, the thin narrow web 11 (FIGURES 3, 4), formed as a consequence of the molding operation, can be retained. The web extends across the front end of the anchor transverse to the direction in which the head is spread apart. When not in use, the two halves of the anchor, as formed by the slits 7, are held together by the web, which permits the anchor to spread within certain limits without itself being destroyed, although it is distorted.

The anchor is easily inserted into a drill hole, for example, because the wings automatically bend down and offer no appreciable resistance. When the anchor is inserted, the leading edge 9 of each wing, because it is relatively narrow and sharp, forms or cuts a one-way path in the material, such as masonry or brickwork, thus providing a point of support for the wing when the tightening screw is screwed in. The screw forces the wings to press with greatly increased force against the material of the wall and to raise from the body of the anchor. If a part of the wings where they join the body project interiorly of the anchor, as previously mentioned, the screw will press against the projection, causing the wings to bear even more firmly against the wall.

With this form and arrangement of the wings, the entire leading edge 9 engages the wall and prevents the anchor from revolving while the tightening screw is turned in.

The triangular or delta-shaped wings of the invention can be employed with anchors of other design, such as those having an unslitted or straight slitted jacket. In the latter case, the wings can be located on the upper or lower part of the expansion portion of the anchor.

Should the wings be located in the upper part, each slit in the upper portion can be shifted with respect to the corresponding slit in the lower part and the two sections of each slit connected by a transversely extending slit.

I claim:

1. A screw anchor molded of synthetic plastic, including:

an elongated circular body portion defining an axis, first and second ends, and having an axial opening at said first end extending at least part way along the length of said body, for accepting a tightening screw;

at least one projecting resilient, planar member extending from the surface of said body at an acute angle therefrom and in the same direction as that in which the tightening screw is turned when screwed into the anchor, said member being in the general shape of a triangle, having a first side common with said body, a second side spaced from said body and converging towards said first side in the direction of said second end, and a third side forming the base of the triangle;

said first side defining a line of contact with the body that slants, with respect to said axis, in the said turning direction of the tightening screw;

said second side converging towards said first side at such an angle that when the member is bent down, the second side extends essentially parallel to said axis;

first and second diametrically opposed slits extending from said second end along a portion of the length of said body, to form an expansible head, said slits defining forward and rear edges, as determined by the direction of rotation of the tightening screw when screwed into the anchor; said axial opening communicating with said slits along at least a portion of their length from said second end; and said member projecting from the rear edge of one of said slits.

2. The anchor of claim 1, including a second member projecting from the rear edge of the other of said slits.

3. The anchor of claim 1, wherein said third side joins with said body at the end of said slit remote from said second end.

4. A screw anchor molded of synthetic plastic comprising:

an elongate circular body defining an axis, first and second ends, and having an axial opening at said first end extending at least part way along the length of the body for accepting a tightening screw, an anchoring member on said body normally projecting therefrom and adapted to be bent down as the body is inserted into a hole and form an anchor to prevent rotation of the body when receiving a tightening screw, said anchoring member presenting opposite sides and a base portion, one of said sides being integrally joined with said body and the other side, when bent down, extending essentially parallel to said axis whereby engagement of said other side against a hole surface as the body is inserted into the hole is along a line parallel to said axis to obviate rotation of the body during insertion, said anchoring member being triangular with its opposite sides converging, and said one side being joined to said body along a line which slants, with respect to said axis, in the turning direction of the tightening screw whereby said other side lies essentially parallel to said axis when bent down as aforesaid.

5. The screw anchor as defined in claim 4 including a recess in said body for receiving said anchoring member when bent down.

References Cited

UNITED STATES PATENTS

| 1,182,015 | 5/1916 | Kennedy | 85—72 |
| 3,094,892 | 6/1963 | Topf | 85—72 |
| 3,199,398 | 8/1965 | Weisz | 85—83 |
| 3,283,642 | 11/1966 | Ott | 85—83 |

FOREIGN PATENTS

| 1,342,218 | 9/1963 | France. |
| 1,346,754 | 11/1963 | France. |
| 1,367,208 | 6/1964 | France. |
| 710,238 | 9/1941 | Germany. |

MARION PARSONS, Jr., *Primary Examiner.*